US011140834B2

(12) United States Patent
Yoshida

(10) Patent No.: US 11,140,834 B2
(45) Date of Patent: Oct. 12, 2021

(54) PLANT CULTIVATION EQUIPMENT

(71) Applicants: FUJI SEIKO CO., LTD., Hashima (JP); FUJI SHOJI CO., LTD., Hashima (JP)

(72) Inventor: Masashi Yoshida, Hashima (JP)

(73) Assignees: FUJI SEIKO CO., LTD., Hashima (JP); FUJI SHOJI CO., LTD., Hashima (JP)

( * ) Notice: Subject to any disclaimer, the term of this patent is extended or adjusted under 35 U.S.C. 154(b) by 294 days.

(21) Appl. No.: 15/549,598

(22) PCT Filed: Feb. 18, 2015

(86) PCT No.: PCT/JP2015/054472
§ 371 (c)(1),
(2) Date: Aug. 8, 2017

(87) PCT Pub. No.: WO2016/132486
PCT Pub. Date: Aug. 25, 2016

(65) Prior Publication Data
US 2018/0027747 A1   Feb. 1, 2018

(51) Int. Cl.
*A01G 9/02* (2018.01)
*A01G 7/06* (2006.01)
(Continued)

(52) U.S. Cl.
CPC .............. *A01G 7/06* (2013.01); *A01G 7/00* (2013.01); *A01G 9/0299* (2018.02); *A01G 31/00* (2013.01);
(Continued)

(58) Field of Classification Search
CPC ... A01G 7/02; A01G 7/06; A01G 9/02; A01G 9/029; A01G 9/0299; A01G 9/14;
(Continued)

(56) References Cited

U.S. PATENT DOCUMENTS 2,244,082 A * 6/1941 Reyniers ................... B01L 1/04
600/21
4,028,847 A * 6/1977 Davis ................... A01G 31/042
47/65
(Continued)

FOREIGN PATENT DOCUMENTS

CA    2776850 A1 * 11/2013 ............... A01G 9/24
CN    1559194 A      1/2005
(Continued)

OTHER PUBLICATIONS

Extended European Search Report dated Jan. 31, 2018 in European Patent Application No. 15882589.3, 8 pages.
(Continued)

*Primary Examiner* — Lisa L Tsang
(74) *Attorney, Agent, or Firm* — Oblon, McClelland, Maier & Neustadt, L.L.P.

(57) ABSTRACT

The plant cultivation equipment performs planting work of seeds or seedlings without taking much labor and without attaching bacteria and includes a packing work room which includes a sterilization activity composition supply device which supplies the packing work room with a predetermined amount of sterilization activity composition which sterilizes the packing work space into which the packing materials are transferred, a sterilization activity composition detecting device provided in the packing work room and detecting the concentration of the sterilization activity composition, an exhaust device which discharges the sterilization activity composition from the packing work room and an outside air supply device which supplies the packing work room with the outside air through filter, capable of catching the sterilization activity composition, when the sterilization activity composition is discharged.

2 Claims, 6 Drawing Sheets

(51) Int. Cl.
*A01G 31/00* (2018.01)
*A01G 31/04* (2006.01)
*A01G 7/00* (2006.01)
*A01G 9/029* (2018.01)
A01G 9/20 (2006.01)
A01G 31/02 (2006.01)

(52) U.S. Cl.
CPC .............. *A01G 31/04* (2013.01); *A01G 9/20* (2013.01); *A01G 31/02* (2013.01); *Y02P 60/21* (2015.11)

(58) Field of Classification Search
CPC .... A01G 9/1423; A01G 9/143; A01G 9/1476; A01G 9/18; A01G 9/24; A01G 9/246; A01G 9/249; A01G 31/02; A01G 31/04; A01G 31/045; A01G 31/00; A01G 7/00; A61L 9/015; A61L 9/032; F24F 3/16; F24F 3/161; F24F 2003/1671; F24F 3/02; F24F 3/04; F24F 3/06; F24F 3/065; F24F 3/08; F24F 3/10
USPC .......... 47/62 R, 62 C, 17, 60, 61, 63; 52/234
See application file for complete search history.

(56) References Cited

U.S. PATENT DOCUMENTS

| | | | | |
|---|---|---|---|---|
| 4,216,618 A * | 8/1980 | Haub | .................... | A01G 31/045 47/39 |
| 4,337,986 A * | 7/1982 | Haub | .................... | A01G 31/042 384/456 |
| 4,476,651 A * | 10/1984 | Drury | .................... | A01G 31/042 47/65 |
| 4,617,755 A * | 10/1986 | Ikeda | .................... | A01G 31/045 47/65 |
| 5,212,906 A | 5/1993 | Okuno et al. | | |
| 5,323,567 A * | 6/1994 | Nakayama | ........... | A01G 31/042 47/65 |
| 6,645,429 B1 | 11/2003 | Raniwala | | |
| 7,465,225 B2 * | 12/2008 | Ohmura | .................. | F24F 3/161 454/187 |
| 8,388,900 B2 * | 3/2013 | Benedek | ................. | A61L 9/015 422/1 |
| 9,789,480 B2 * | 10/2017 | Funazuka | .................. | B01L 1/04 |
| 10,568,279 B2 * | 2/2020 | Takashima | ............. | A01G 7/045 |
| 10,912,261 B2 * | 2/2021 | Takashima | ............. | A01G 31/04 |
| 2004/0244283 A1 * | 12/2004 | Chen | ........................ | A01G 9/00 47/17 |
| 2006/0112632 A1 | 6/2006 | Mori et al. | | |
| 2008/0256853 A1 * | 10/2008 | Toto | ........................ | A01G 18/60 47/1.1 |
| 2010/0189607 A1 * | 7/2010 | Yokoi | ..................... | A61L 2/208 422/116 |
| 2014/0290162 A1 | 10/2014 | Tanimoto | | |
| 2014/0311025 A1 * | 10/2014 | Pauls | ........................ | A01G 9/24 47/17 |
| 2015/0264871 A1 * | 9/2015 | Finnerty | .................. | A01G 9/18 47/62 A |
| 2016/0010883 A1 * | 1/2016 | Jornitz | ..................... | E03C 1/02 454/187 |

FOREIGN PATENT DOCUMENTS

| | | |
|---|---|---|
| CN | 201015317 Y | 2/2008 |
| CN | 102084786 A | 6/2011 |
| CN | 201933810 U | 8/2011 |
| CN | 1750751 B | 2/2012 |
| EP | 0 402 464 A1 | 12/1990 |
| JP | 62-55029 A | 3/1987 |
| JP | 63-44814 A | 2/1988 |
| JP | 11-155373 A | 6/1999 |
| JP | 2004-321175 A | 11/2004 |
| JP | 2014-198079 A | 10/2014 |

OTHER PUBLICATIONS

International Search Report dated Mar. 24, 2015, in PCT/JP2015/054472 filed Feb. 18, 2015.
Chinese Office Action dated Aug. 22, 2019, in Patent Application No. 201580075992.7, 18 pages (with English translation).
Letter of Chinese Patent Attorney for Patent Application No. 201580075992.7, received on Sep. 24, 2019, 3 pages.
Indian Office Action dated Jul. 16, 2020 in Indian Patent Application No. 201717027111 (with English translation), 6 pages.

* cited by examiner

PLANT CULTIVATION EQUIPMENT

TECHNICAL FIELD

The present invention relates to a plant cultivation equipment.

BACKGROUND ART

Recently, a system of so-called plant factory has been known, which enables a stable farm product production that would not be influenced by the season or the weather, to artificially control the environmental conditions, such as, light, temperature, carbon dioxide, culture fluid, etc.

As an example of plant cultivation equipment provided in such plant factory, Patent Literature 1 discloses fluorescent light as an artificial light source which output is controlled by inverter, a cultivation tank which circulates the culture fluid containing sterilizer component, using a circulation pump and a contact oxidation type combustion device which keeps the carbon oxide gas concentration to be within a predetermined range, etc.

Further, Patent Literature 2 discloses an equipment which includes a plurality of pallets configured to have the root portions of grown plants suspend into the culture fluid, a moving rod which connects a plurality of pallets and a conveyor type movable body which engages with and moves the moving rod to transfer the plants depending on the growing stage thereof, etc. In such cultivation equipment disclosed in the Patent Literature 2, the plants are moved in one direction in response to the growth condition of the plants and the seeds or seedlings are positioned at the base end side in the moving direction and sufficiently grown plants are positioned at the tip end side in the moving direction. Further, in order to respond to the change of the plant size accompanied by the growth, the interval between the neighboring plants is variably set, depending on the growth stage of the plants.

CITATION LIST

Patent Literature

[Patent Literature 1] JP H11 (1999)-155373 A
[Patent Literature 2] JP S62 (1987)-55029 A

SUMMARY OF INVENTION

Technical Problem

In the cases that the plants cultivated in the equipment disclosed in the Patent Literatures 1 and 2 relate, for example, to the plants with leaves for food, such as, lettuces, and in such cases, the plant cultivating compartment has to be provided with a sufficient sterile condition space. Further, as a pre-stage of the cultivation of the plants, in order to arrange the seeds or seedlings in the seedling culture medium or in the culture fluid, a planting work is necessary for planting the seeds or seedlings in the seedling culture medium and culture fluid provided on the pallets or the like. Under such planting work, if bacteria are attached to the seeds or seedlings, the sterile condition cannot be secured.

In order to solve such issues, the working compartment where the planting of the seeds or the seedlings is performed is configured to be structured as a clean room and the worker entering into the room has to wear a clean room wear which includes a dust-free wear, a cap, a mask and shoes, etc. and further has to take an air-shower. However, such preparation for entering the clean room takes much labor and time and in addition, the bacteria cannot be completely removed by taking air shower after wearing the clean room wear.

The objective of the invention is to provide a plant cultivation equipment which can achieve a planting work for planting seeds or seedlings without taking much labor and without attaching bacteria.

Solution to Problem

The plant cultivation equipment according to the present invention is characterized in that the plant cultivation equipment includes a plurality of culture medium holding units equipped with a medium for raising seeds or seedlings of plants, a planting work room with a bacteria intrusion prevention structure that can prevent bacteria from intruding inside of the planting work room from outside thereof, upon performing a planting work for planting the seeds or seedlings of the plants in the medium of the culture medium holding units within the planting work room and a plant cultivation room for cultivating the plants planted in the medium of the culture medium holding units by transferring the plurality of culture medium holding units, in which the planting of the seeds or seedlings of plants has been performed, into the planting work room. The planting work room includes a sterilization activity composition supplying device which supplies the planting work room with a predetermined amount of a sterilization activity composition which sterilizes a working space of the planting work room under a state that the plurality of culture medium holding units has been transferred into the planting work room, a sterilization activity composition concentration detecting device provided in the planting work room for detecting a concentration of the sterilization activity composition, an exhaust device which discharge the sterilization activity composition from the planting work room and an outside air supply device which supplies the planting work room with an outside air through a filter which can catch the bacteria upon discharging the sterilization activity composition from the planting work room.

According to the invention, the culture medium holding units transferred into the planting work room and the working space of the planting work room are sterilized by the sterilization activity composition supplied from the sterilization activity composition supplying device. The sterilization work can be surely executed by the sterilization activity composition concentration detecting device under the concentration of the sterilization activity composition being controlled to be the level necessary for sterilization. Then, the culture medium holding units under the state that the seeds or seedlings are planted on the medium thereof are transferred into the plant cultivation room, under the state the sterilization activity composition which may have a bad influence on the plants has been completely removed by the exhaust device and the outside air supply device. Thus, the sterilization state of the seeds or seedlings before cultivation and the media can be assured and the cultivation of plants which have no diseases can be performed. Since the planting work is performed in the planting work room with bacteria intrusion prevention structure, the workers do not need to wear cleaning room wears and accordingly, the planting work can be easily and promptly performed.

DESCRIPTION OF EMBODIMENTS

Embodiment (Overall Structure of Plant Cultivation Equipment)

Figure 1:
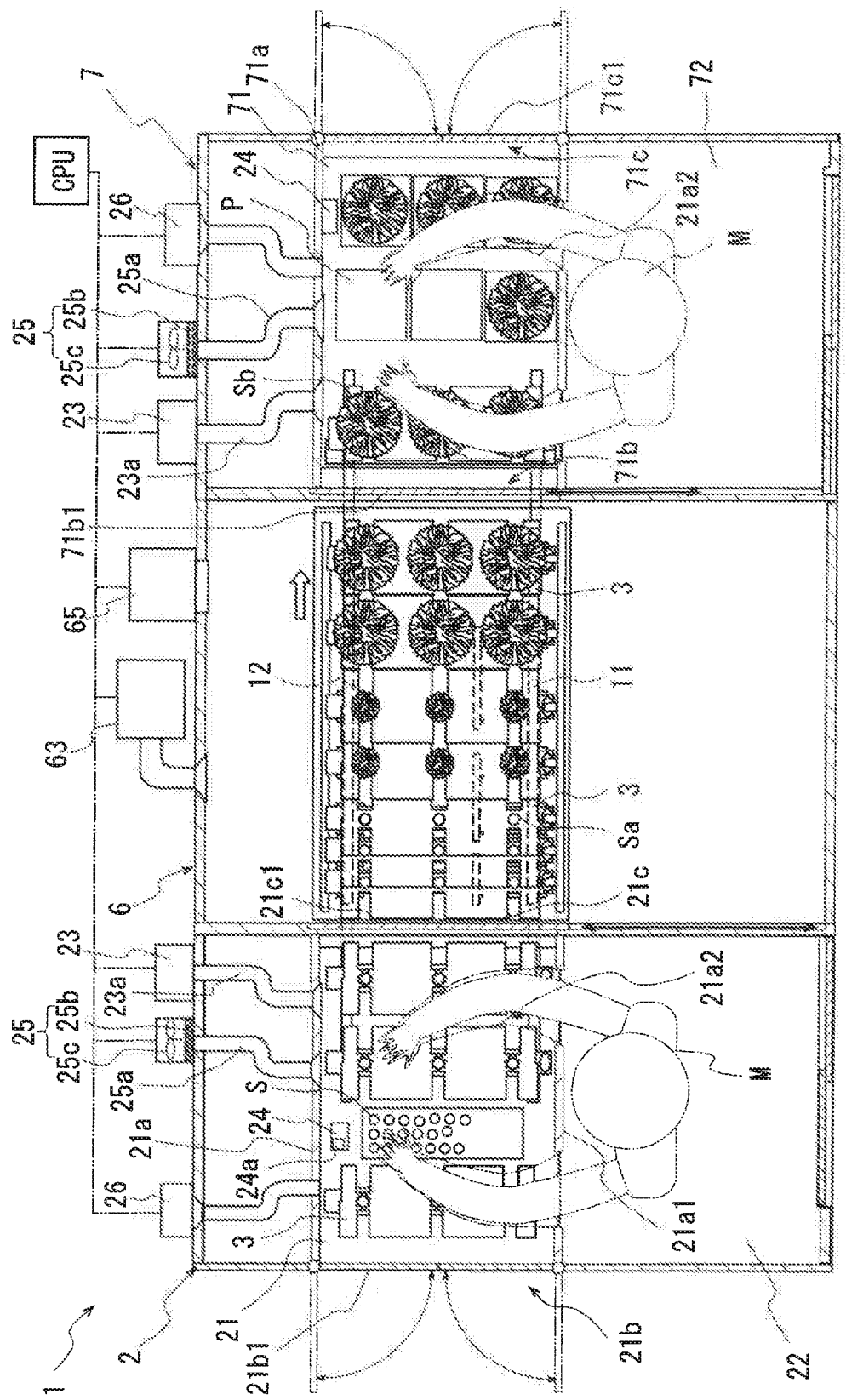
FIG. 1 is a plane view of the plant cultivation equipment associated with the embodiment of the invention.

The overall structure of the plant cultivation equipment 1 will be explained with reference to FIG. 1. The plant cultivation equipment 1 In FIG. 1 is formed mainly by the planting work room 2, a plant cultivation room 6 and a packing work room 7. The seedlings S transferred into the planting work room 2 are planted in the seedling culture medium 8a of the culture medium holding unit 3 and the plants Sa planted in the seedling culture medium 8a are cultivated in the plant cultivation room 6. The cultivation completed plants Sb are packed in the packing work room 7 and shipped.

(Planting Work Room)

Figure 4:
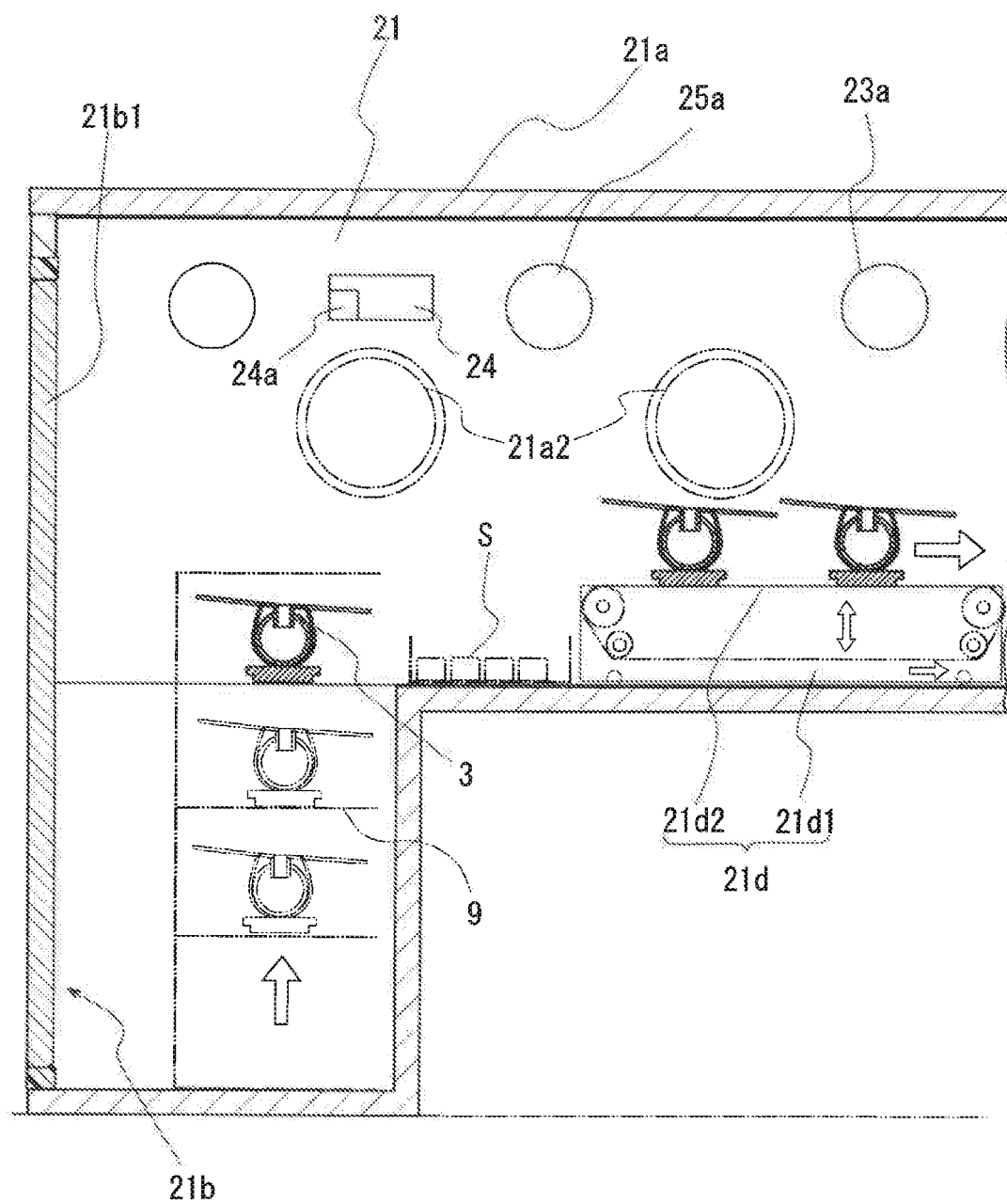
FIG. 4 is a cross sectional view of outline of the inside of the planting work room.

As shown in FIGS. 1 and 4, the seedlings S and the culture medium holding units 3 are transferred into the planting work room 2. The planting work room 2 has a work executing room 21 for executing planting work therein and a worker room 22 in which worker works. The work executing room 21 includes a housing 21a which air-tightness is highly secured, a transfer inlet 21b, through which the seedlings S and the culture medium holding units 3 are moved in, a transfer outlet 21c through which the culture medium holding units 3, under the state that the seedlings S have been planted in the seedling culture medium 8a of the culture medium holding units 3, are moved out and a transfer device 21d which transfers the culture medium holding units 3 from the transfer outlet 21c to a transfer mechanism 13 (See FIG. 6) of the plant cultivation room 6.

After sterilization, for example, by sodium hypochlorite, the seedlings S, which are for example, seeds or seedlings of lettuce, which leaves are used for food, are transferred into the work executing room 21 under the state that the seedlings S are air-tightly accommodated in a sealed container (not shown). Detail of the culture medium holding unit 3 will be explained later.

The housing 21a of the work executing room 21 is formed in a rectangular box shape and a transparent panel 21a1 made of a strengthened glass is fit into a side window which faces the worker room 22. A globe 21a2 is provided at the transparent panel 21a1 and is provided with an insertion opening provided at the worker room 22 side the insertion opening projects inside of the housing 21a. While a worker M inserts hands and arms into the housing 21a from the insertion opening, the worker M can execute planting work within the housing 21a, keeping a separated condition between the inside of the housing 21a and the worker room 22. Further, the worker M can observe the inside of the housing 21a through the transparent panel 21a1 with own eyes. An isolator is used for the housing 21a of the work executing room 21 as the bacteria intrusion prevention structure.

The transfer unlet 21b is provided with a center-open door 21b1. Sealing materials (not shown) are fit between the center-open door 21b1 and the transfer inlet 21b of the housing 21a and between the mutually contacting portions of the center-open door 21b1. Thus, when the door 21b1 is closed, no outside air can enter or exit from the transfer inlet 21b.

A sliding door 21c1 is provided at the transfer outlet 21c which is provided between the planting work room 2 and the plant cultivation room 6. Sealing materials (not shown) are disposed between the sliding door 21c1 and the transfer outlet 21c. Thus, when the sliding door 21c1 is closed, no air communication is allowed between the planting work room 2 and the plant cultivation room 6. The opening/closing operation of the sliding door 21c1 is performed by driving a motor (not shown) and the motor is driven by a control device CPU (Central Processing Unit).

The transfer device 21d is provided with a transfer device bed 21d1, a belt conveyor 21d2 which transfers the culture medium holding units 3 thereon and a driving motor (not shown) which drives the belt conveyor 21d2. The movement of the transfer device bed 21d1 is formed to have a predetermined width and is movably provided in front/rear directions along the conveying direction. The movement of the transfer device bed 21d1 in front/rear directions is controlled by a transfer motor (not shown). The belt conveyor 21d2 is movably provided in up/down directions relative to the transfer device bed 21d1, when the sliding door 21c1 of the work executing room 21 is opened. The entire structure of the transfer device 21d advances in the transfer direction so that the culture medium holding units 3 on the belt conveyor 21d2 are transferred to the first transfer mechanism 13 located within the plant cultivation room 6. The transfer motor and the driving motor are driven by the control device CPU.

The sterilization activity composition supply pipe 23a is open to the inside space of the housing 21a and is in communication with the sterilization activity composition supplying device 23 provided on the outer wall of the planting work room 2. As the sterilization activity composition, an ozone is used, for example. The sterilization activity composition supplying device 23 is for example, an ozone generation device of silent discharge type which generates ozone by contacting oxygen in the space, where the high AC (alternative current) voltage is discharged.

The sterilization activity composition concentration detecting device 24 is provided inside of the housing 21a for detecting the concentration of the ozone in the housing 21a. The signal indicating a detected ozone concentration value is transmitted to the control device CPU and by the control device CPU, the AC voltage of the sterilization activity composition supplying device 23 can be controlled to thereby control ozone generation amount.

The sterilization activity composition concentration detecting device 24 includes a timer 24a which measures the lapsed time from the start of supply of a predetermined ozone concentration. As the predetermined ozone concentration, for example, the value range between 0.8 and 1.0 ppm is set. The timer 24a sends the signal which informs that four hours have passed when four hours lapsed to the control device CPU. The control device CPU stops supply of ozone by the sterilization activity composition supplying device 23.

The outside air supply pipe 25a is open to the inside space of the housing 21a and is in communication with the outside air supply device 25. The outside air supply device 25 includes an HEPA (High Efficiency Particulate Air Filter) filter 25b which corresponds to bacteria collectable filter) and a ventilation fan 25c. The intake outside air is filtered through the HEPA filter 25b and filtered outside air is supplied to the housing 21a by using the ventilation fan 25c.

The exhaust device 26 is provided in the housing 21a and the ozone gas inside the housing 21a is discharged when the outside air is supplied into the housing 21a by the outside air supply device 25.

After confirming that the ozone is not remaining in the housing 21, the worker M takes out the seedlings S from the sealed container and plants the seedlings S in the seedling culture medium 8a of the culture medium holding unit 3 from the worker room 22 side through the globe 21a2. The culture medium holding units 3 on which the seedlings S have been planted are put and arranged on the belt conveyor 21d2 of the transfer device 21d.

(Outline of Transfer Unit)

The seedlings S cultivated in the plant cultivation equipment 1 are planted in seedling culture medium 8a of the culture medium holding unit 3 and transferred together with the culture medium holding unit 3.

Figure 2:
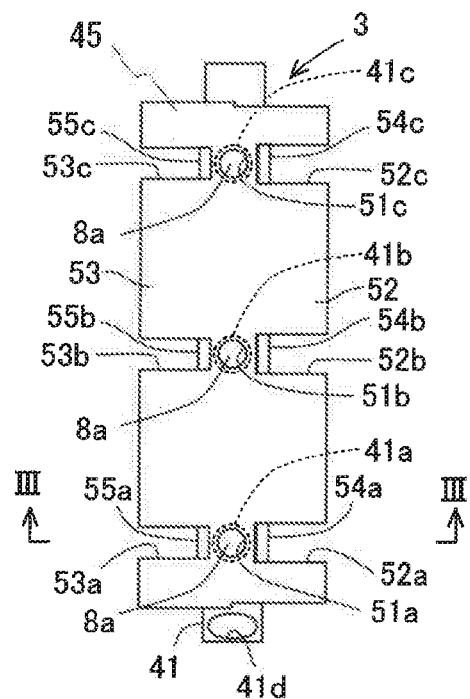
FIG. 2 is a plane view of the culture medium holding unit.
Figure 3:
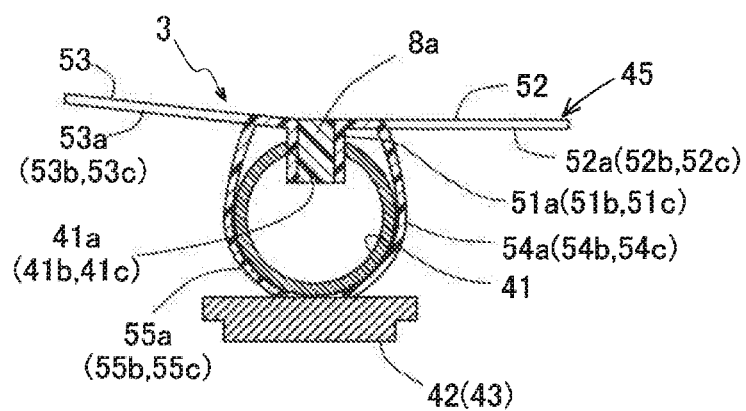
FIG. 3 is a cross sectional view of the culture medium holding unit, cut along the line III-III of FIG. 2.

The culture medium holding unit 3 includes, as shown in FIGS. 2 and 3, a cylindrical fluid passage member 41, culture medium holding portions 51a through 51c provided on the upper surface of the fluid passage member 41 provided at three portions in a longitudinal direction, supporting members 42 and 43 provided at lower surface of the fluid passage member 41 positioned facing to the later explained pair of rails 11 and 12 (in the plant cultivation room 6) and a plant holding portion 45 formed integrally with the culture medium holding portions 51a through 51c.

The fluid passage member 41 is formed in a cylindrical shape and forms a fluid passage through which the culture fluid flows. According to the embodiment, the fluid passage member 41 is formed in a cylindrical shape with a circular cross section, but the shape is not limited to cylindrical with a circular cross section and a rectangular tubular shape may be adoptable. A plurality of through holes 41a through 41c is provided on the fluid passage member 41 having a predetermined interval separated from one another along the transfer direction. According to the embodiment, the plurality of through holes is formed in a circular hole shape. A hole 41d, through which the culture fluid flows from the culture fluid supplying portion 19 (See FIG. 5), is provided on an upper surface at one end of the fluid passage member 41. A through hole (not shown) through which the culture fluid is discharged to the culture fluid collecting portion 20 (See FIG. 5), is provided at the upper surface of the other end of the fluid passage member 41. The culture fluid flows from the one end to the other end of the fluid passage member 41.

The supporting members 42 and 43 are provided at the lower surface of the fluid passage member 41 and positioned corresponding to the positions of the pair of rails 11 and 12. The supporting member 42 moves on the pair of rails 11 and 12 and further, the supporting member 42 is engaged with the transfer mechanisms 13 through 15 in the transfer direction and movable according to the operation of the transfer mechanisms 13 through 15.

The lettuce seeds or the seedlings are arranged on the seedling culture media 8a. According to the embodiment, the seedling culture media 8a are formed in a columnar shape. The seedling culture media 8a are made by a material which can absorb the culture fluid which flows through the inside of the fluid passage member 41.

The plant holding portion 45 is made by material such as for example, by the PP (polypropylene) resin or PET (Polyethylene Terephthalate) resin and is formed integrally by press-forming. The plant holding portion 45 is formed to be a film shape with, for example, several millimeters in thickness having a flexible characteristic. The plant holding portion includes culture medium holding portions 51a through 51c, a first plate portion 52, a second plate portion 53, first winding portions 54a through 54c and second winding portions 55a through 55c.

The culture medium holding portions 51a through 51c are formed in a cylindrical shape with a circular cross section as shown in FIGS. 2 and 3. The culture medium holding portions 51a through 51c accommodate and hold the seedling culture media 8a. The culture medium holding portions 51a through 51c are inserted into the plurality of through-holes 41a through 41c of the fluid passage member 41. Portions of the culture medium holding portions 51a through 51c are projecting upward from the through-holes 41a through 41c. In other words, the culture medium holding portions 51a through 51c are arranged projecting outside of the fluid passage member 41 to form a gap between the first and the second plate portions 52 and 53 and the fluid passage member 41. On the other hand, the remaining portions of the culture medium holding portions 51a through 51c configure to be immersed in the culture fluid which flows through the inside of the fluid passage member 41.

The first plate portion 52 is provided, as shown in FIGS. 2 and 3, at the upper side of the fluid passage member 41 and is formed to be extending in a transfer direction (downstream side, or right side as viewed in FIG. 1) from the fluid passage member 41. Further, the first plate portion 52 is provided with a plurality of first slits 52a through 52c at the positions corresponding to the positions of the culture medium holding portions 51a through 51c. The first slits 52a through 52c are open to the tip end side of the first plate portion 52 and the width of each first slit 52a through 52c is set to be larger than each width of the culture medium holding portions 51a through 51c.

The second plate portion 53 is provided at the upper side of the fluid passage member 41 and is formed extending in the direction opposite to the transfer direction (upper stream side, left side as viewed in FIG. 1) from the fluid passage member 41.

Further, the second plate portion 53 includes a plurality of second slits 53a through 53c at the positions corresponding to the positions of the culture medium holding portions 51a through 51c. Each of the width of the second slits 53a through 53c is formed to be wider than each width of the corresponding culture medium holding portions 51a through 51c.

The first winding portions 54a through 54c are wound around the outer periphery of the fluid passage member 41 as shown in FIGS. 2 and 3. The first winding portions 54a through 54c are formed by lancing machining to be in the shape following the outer peripheral surface of the fluid passage member 41.

The second winding portions 55a through 55c are wound around the outer periphery of the fluid passage member 41. The second winding portions 55a through 55c are formed by the members corresponding to the second slits 53a through 53c, when the second slits 53a through 53c are formed by lancing machining. Accordingly, the first winding portions 54a through 54c are formed at the positions corresponding to the positions of the culture medium holding portions 51a through 51c. The first winding portions 54a through 54c are formed by lancing machining to be in the shape following the outer peripheral surface of the fluid passage member 41.

(Plant Cultivation Room)

The plant cultivation room includes the pair of rails 11 and 12, transfer mechanisms 13 through 15, lighting devices 16 through 18, culture fluid supplying portion 19, culture fluid collecting portion 20 (See FIGS. 5 and 6), carbon dioxide supplying device 63 and exhaust device 65 (See FIG. 1).

The pair of rails 11 and 12 is provided in parallel with each other extending in the transfer direction of the transfer units 31 through 37 (in the arrow direction of FIG. 1). The pair of rails 11 and 12 is provided for guiding the transferring of the transfer units 31 through 37. Thus, as explained above, the supporting members of the culture medium holding unit 3 are arranged at the lower surface of the fluid passage member 41 facing to the pair of rails 11 and 12.

Figure 6:
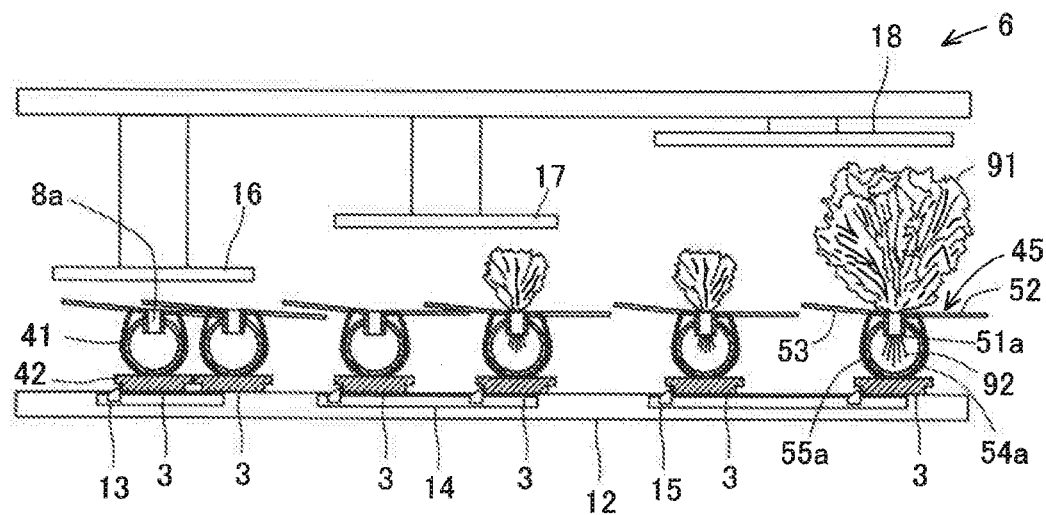
FIG. 6 is a cross sectional view cut along the line VI-VI of FIG. 5.

The transfer mechanisms 13 through 15 include a first transfer mechanism 13, a second transfer mechanism 14 and a third transfer mechanism 15. Each transfer mechanism 13 through 15 is provided between the pair of rails 11 and 12 as shown in FIG. 6 and moves the culture medium holding unit 3 in the transfer direction. Each transfer mechanism 13 through 15 includes an engagement hook which reciprocates in advance/retreat directions with respect to the transfer direction. The engagement hook engages with the supporting members 42 and 43 of the culture medium holding unit 3 when advances in the transfer direction and disengages from the supporting members 42 and 43 and returns to the retreated position when retreats in the direction opposite to the transfer direction. The first transfer mechanism 13 transfers the culture medium holding unit 3 to a first advance position. The second transfer mechanism 14 is arranged at a downstream side of the first transfer mechanism 13 relative to the transfer direction and positions in series with the first transfer mechanism 13. The second transfer mechanism 14 transfers the culture medium holding unit 3 to a second advance position. The third transfer mechanism 15 is arranged at a downstream side of the second transfer mechanism 14 relative to the transfer direction and positions in series with the second transfer mechanism 14. The third transfer mechanism 15 transfers the culture medium holding unit 3 to a third advance position.

The transfer distances of the transfer mechanisms 13 through 15 are set to become longer in order from the distance transferred by the first transfer mechanism 13, the distance transferred by the second transfer mechanism 14 and the distance transferred by the third transfer mechanism 15. In other words, when the culture medium holding unit is transferred by the first transfer mechanism 13, the distance in the transfer direction between the mutually neighboring culture medium holding units is the shortest. When the culture medium holding unit is transferred by the second transfer mechanism 14, the distance in the transfer direction between the mutually neighboring culture medium holding units is next shortest. And when the culture medium holding unit is transferred by the third transfer mechanism 15, the distance in the transfer direction between the mutually neighboring culture medium holding units is the longest. Thus, the transfer mechanisms 13 through 15 transfer the transfer unit 3 by changing the distances in the transfer direction between the two mutually neighboring culture medium holding units 3.

The lighting devices 16 through 18 shed light over the plants held on the transferring culture medium holding unit 3. The height of each lighting device 16 through 18 is different from one another. The first lighting device 16 is provided at the position corresponding to the first transfer mechanism and is the lowest among the three. The second lighting device 17 is provided at the position corresponding to the position of the second transfer mechanism 14 and this position is higher than the position of the first lighting device 16. The third lighting device 18 is provided at the position corresponding to the position of the third transfer mechanism 15 and the position is higher than the position of the second lighting device.

Figure 5:
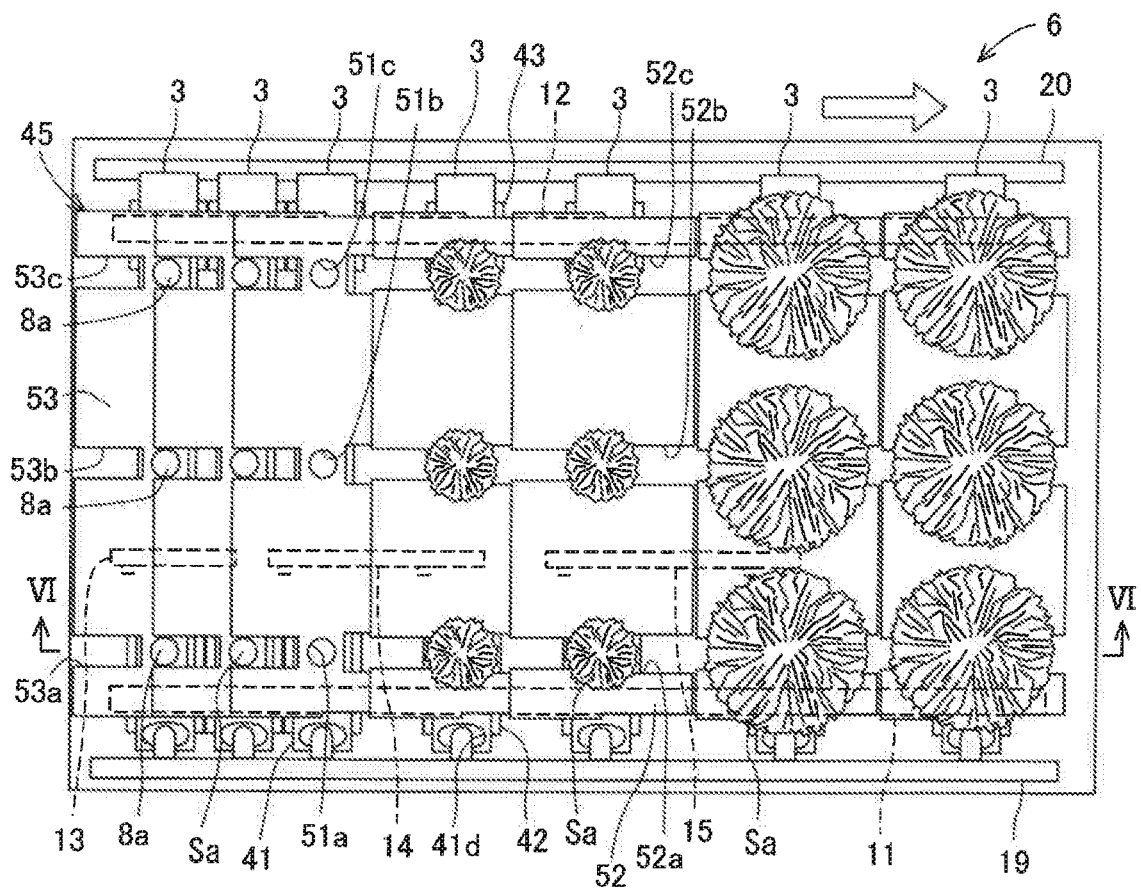
FIG. 5 is an outline view of the inside of the plant cultivation room.

The culture fluid supplying portion 19 is provided at one outside (lower side as viewed in FIG. 5) rails of the pair of rails 11 and 12 in opposing direction thereto (up/down direction as viewed in FIG. 5). The culture fluid supplying portion 21 supplies the fluid passage member 41 which forms the position determined culture medium holding units 3 with the culture fluid. The culture fluid collecting portion 20 is provided at the other side outside (upper side as viewed in FIG. 5) rails of the pair of rails 11 and 12 in opposing direction thereto. The culture fluid collecting portion 20 collects the culture fluid discharged from the fluid passage member 41 which forms the position determined culture medium holding units 3.

(Packing Work Room)

Figure 7:
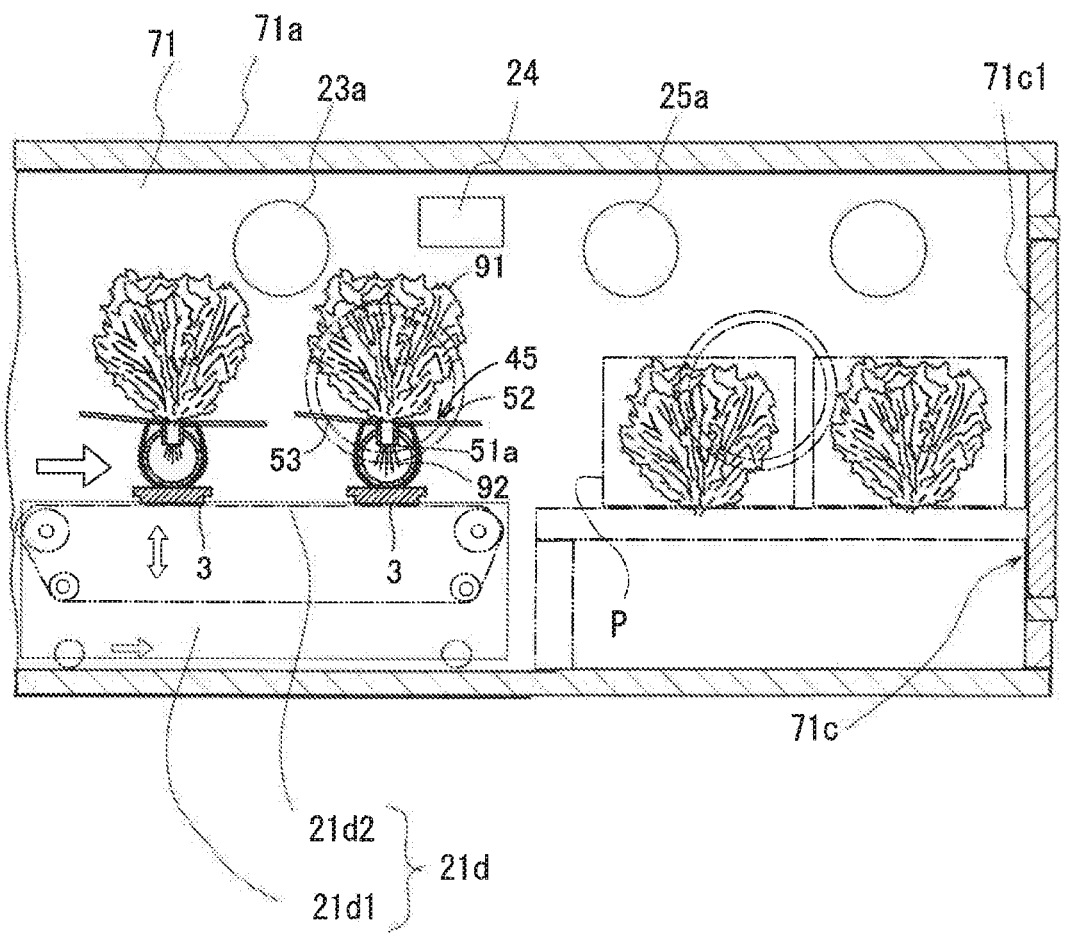
FIG. 7 is an outline of the work executing room of the packing work room shown in cross section.

As shown in FIG. 7, the plants Sb on the culture medium holding unit 3, cultivation of which has completed in the plant cultivation room 6, are cut at the base portions of the leaves 91 by a cutting tool by the worker M and the leaves 91 are separated from the root portions 92 of the plants. The leaves 91 of the plants Sb are packed by for example, a packing material P and shipped.

The packing work room 7 is also controlled so that no bacteria is attached to the plants Sb before packing. Therefore, similar to the planting work room 2, the packing work room 7 includes the work executing room 71 and the worker room 72 where the workers works (See FIG. 1).

The sterilization activity composition supply pipe 23a is open to the housing 71a of the work executing room 71 and the sterilization activity composition supply pipe 23a is in communication with the sterilization activity composition supply device 23. The housing 71a is provided with the sterilization activity composition concentration detecting device 24 for detecting the concentration of ozone inside of the housing 71a. A timer 24a is provided in the sterilization activity composition concentration detecting device 24 for measuring the lapsed time from the start of supplying of ozone with a predetermined concentration. The outside air supply pipe 25a is open to the housing 71a and is in communication with the outside air supply device 25. The outside air supply device 25 includes the HEPA filter 25b and a ventilation fan 25c.

A sliding door 71b1 is provided at the transfer inlet 71b which is provided between the plant cultivation room 6 and the packing work room 7. The transfer outlet 71c of the packing work room 7 is used for communication with the outside air upon shipping of the plants Sb and is provided with a center-open type door 71c1. Sealing materials are fit between the sliding door 71b1 and the center-open door 71c1 such that when the sliding door 71b1 and the center-open door 71c1 are closed, no air communication is allowed.

Similar to the case of planting work room 2, the sterilization of the outside air entered into the packing work room 7 and the packing material P is executed upon shipping. Thus, the plants Sb packed by the packing material P are maintained securely in a sterilized condition and the plants Sb packed by the packing material P are shipped under the state that the plants Sb are not influenced by the sterilization activity composition.

(Operation of Plant Cultivation Equipment)

Figure 8:
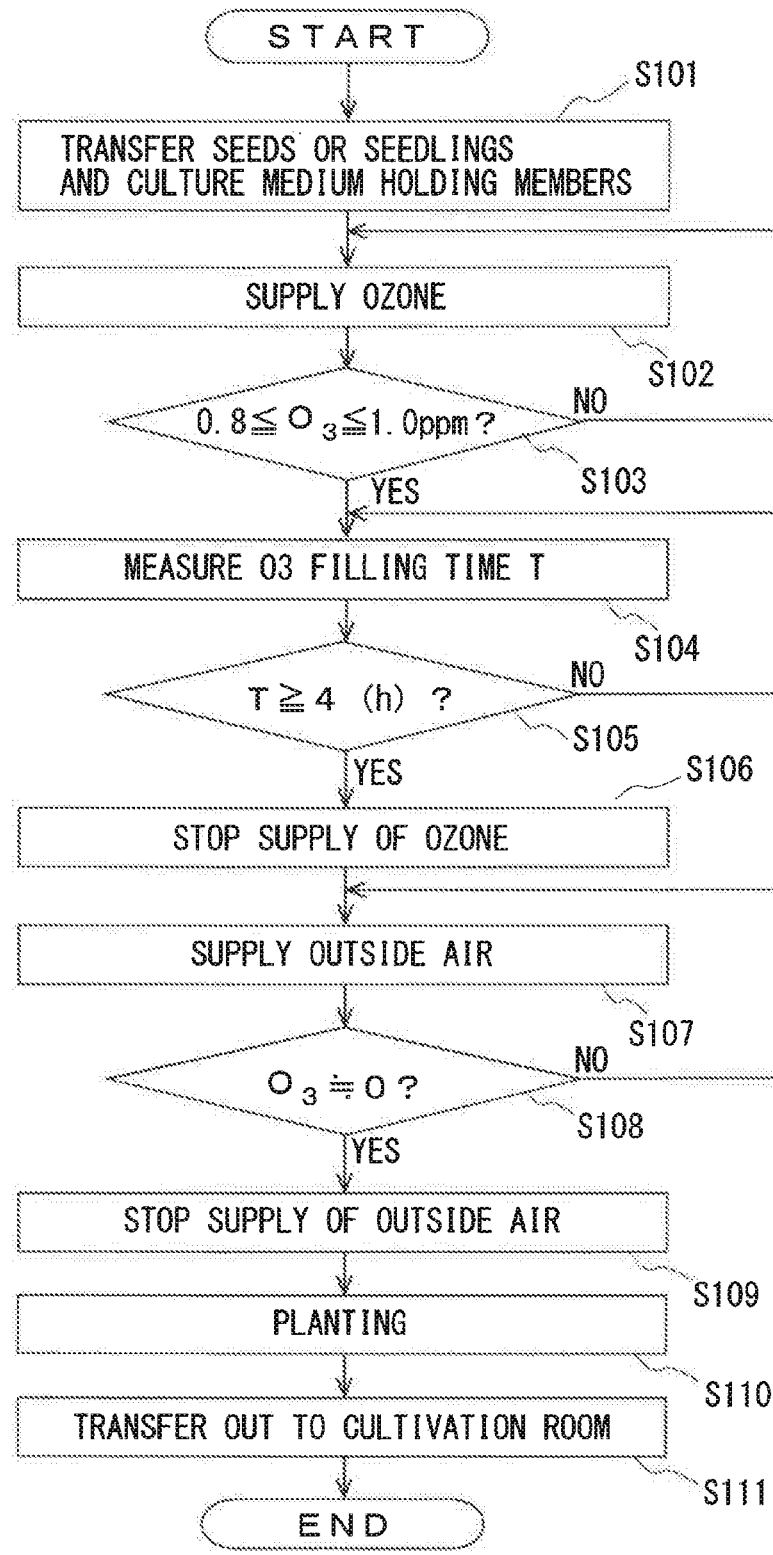
FIG. 8 is a flowchart indicating a work procedure in the planting work room.

Next, the operation of the plant cultivation equipment 1 will be explained with reference to flowchart shown in FIG. 8. Particularly, the planting work in the planting work room 2 will be explained mainly.

First, the center-open door 21b1 of the transfer inlet 21b of the work executing room 21 is opened and as shown in FIGS. 1 and 4, the lettuce seeds as the seeds or seedlings S and the culture medium holding unit 3 are transferred into the room. (Step 101, hereinafter the expression "step" is described in abbreviation as "S"). Every predetermined number of the seeds or seedlings S is housed in the sealed container and transferred into the room. The culture medium holding units 3 are accommodated, for example, in a rack 9 having a plurality of shelves which are movable in up/down directions to be overlapped with one another and at the same time can be raised or lowered vertically and transferred into the room.

Next, the control device CPU operates the sterilization activity composition supply device 23 to generate ozone gas and generated ozone gas is supplied into the work executing room 21 through the sterilization activity composition supply pipe 23a. (S102).

The sterilization activity composition concentration detecting device 24 measures the concentration of ozone in the work executing room 21 and if the ozone with concentration of between 0.8 and 1.0 ppm is detected, sends the signal to the control device CPU (S103). The control device CPU controls to operate the sterilization activity composition supply device 23 such that the concentration of ozone can be maintained to the range between 0.8 and 1.0 ppm. When the concentration does not reach the value of 0.8 ppm, then the program returns to S102 to continue the supplying of ozone.

The timer 24a starts measuring of lapsed time T when the concentration of ozone reached to the predetermined value. (S104).

The control device CPU stops the operation of the sterilization activity composition supply device 23, when the timer 24a detects that the lapsed time T has passed four (4) hours (S106), and at the same time operates the outside air supply device 25 to introduce the outside air into the work executing room 21. Under such control, the control device CPU operates the carbon dioxide supply device 63 of the plant cultivation room 6 to control the atmospheric pressure of the inside of the plant cultivation room 6 to be the level higher than the atmospheric pressure in the work executing room 21. Thus, the ozone existing in the work executing room 21 is prevented from leaking into the plant cultivation room 6.

The control device CPU stops the operation of the outside air supply device, when the concentration of ozone in the work executing room 21 is detected to be zero by the sterilization activity composition concentration detecting device 24 (S109).

The worker M takes out the seeds or seedlings S from the sealed container and at the same time takes out the culture medium holding unit 3 from the rack 9. Then, the worker M plants the seeds or seedlings S in the seedling culture medium 8a of the culture medium holding unit 3 (S110).

The worker M puts the culture medium holding units 3, on which the seeds or seedlings S have been planted, on the belt conveyor 21d2 of the transfer device 21d. Under such operation, the worker advances the belt conveyor 21d2 little by little and while doing so, the worker arranges the culture medium holding units 3, on which the seeds or seedlings S have been planted, on the belt conveyor 21d2. Next, the control device CPU opens the sliding door 21c1 of the transfer outlet 21c and advances the entire transfer device 21d towards the plant cultivation room 6 and transfers the entire transfer device 21d out of the room 21 (S111). The culture medium holding units 3 put on the transfer device 21d are transferred to the first transfer mechanism 13 under the state that the rear end portion of the first transfer mechanism 13 and the front-end portion of the transfer device 21d are overlapping. Under such operation, the belt conveyor 21d2 portion which was once lifted is lowered to be positioned lower than the position of the pair of rails 11 and 12 of the first transfer mechanism 13 to thereby transfer the culture medium holding unit 3. Thus, the procedure of planting work in the planting work room 2 finishes.

Next, the culture medium holding units 3 transferred into the plant cultivation room 6 are transferred by means of the first, second and third transfer mechanisms 13, 14 and 15 depending on the growth condition of the plants. The distance in the transfer direction between the seedling culture media 8a becomes gradually longer in order therefrom. The plants are effectively held by the plant holding portion so that the leaves of the plants which have largely grown by cultivation are not drooped down.

The first lighting device 16 provided at the position corresponding to the first transfer mechanism 13 sheds light at the closest position to the seedling culture media 8a. The second lighting device 17 provided at the position corresponding to the position of the second transfer mechanism 14 sheds light at a position far from the seedling culture media 8a by the height of the grown leaves 91. The third lighting device 18 provided at the position corresponding to the position of the third transfer mechanism 15 sheds light at the position most separated from the seedling culture media 8a. In other words, the lighting devices 16 through 18 are provided at the different positions in height direction depending on the growth of the plants.

In the plant cultivation room 6, the worker M does not need to touch the plants Sa cultivation of which is executed automatically. Accordingly, the non-sterilized state of the plants Sa which have been planted under non-sterilized state in the planting work room 2 can be maintained in the plant cultivation room 6.

Thus, the plants Sb cultivated in the plant cultivation room are transferred out of the plant cultivation room and transferred into the packing work room 7.

Next, in the packing work room 7, sterilization of the packing work room 7 and the packing materials P are executed before the plants Sa, cultivation of which has finished, are transferred into the packing room 7.

The packing material P is transferred into the packing work room 7 from outside through the transfer outlet 71c and after the transferring, the center-open door 71c1 of the outlet 71c is closed. The sliding door 71b1 of the transfer inlet 71b is kept closed.

Next. The control device CPU operates the sterilization activity composition supply device 23 to generate ozone and the generated ozone is supplied inside of the work executing room 71 through the sterilization activity composition supply pipe 23a.

The sterilization activity composition concentration detecting device 24 measures the concentration of ozone in the work executing room 71 and if the ozone with concentration of between 0.8 and 1.0 ppm is detected, sends the signal to the control device CPU. The control device CPU controls to operate the sterilization activity composition supply device 23 such that the concentration of ozone can be maintained to the range between 0.8 and 1.0 ppm.

The timer 24a starts measuring of lapsed time T when the concentration of ozone reached to the predetermined value.

The control device CPU stops the operation of the sterilization activity composition supply device 23, when the timer 24a detects that the lapsed time T has passed four (4) hours, and at the same time the control device CPU operates the outside air supply device 25 to introduce the outside air into the work executing room 71. Under such control, the control device CPU operates the carbon dioxide supply device 63 of the plant cultivation room 6 to control the atmospheric pressure of the inside of the plant cultivation room 6 to be the level higher than the atmospheric pressure in the work executing room 71. Thus, the ozone existing in the work executing room 71 is prevented from leaking into the plant cultivation room 6.

The control device CPU stops the operation of the outside air supply device, when the concentration of ozone in the work executing room 71 is detected to be zero by the sterilization activity composition concentration detecting device 24.

Next, the culture medium holding units 3 on which planting finished plants Sb have been planted are transferred into the work executing room 71 of the packing work room 7 from the plant cultivation room 6. Thus, the transfer operation is performed by the transfer device 21d from the third transfer mechanism 15 of the plant cultivation room 6 to the transfer device 21d of the work executing room 71.

The worker M cuts the leaves 91 at the base portion thereof by a cutting tool and separates the leaves 91 from the root portions of the plants Sb of the culture medium holding units 3, from the worker room 72 side. Thus, only the leaves 91 can be obtained and thus obtained leaves 91 are packed under a sealed state by the packing material P and shipped.

As apparent from the above description, the plant cultivation equipment 1 according to the embodiment includes a plurality of culture medium holding units 3 equipped with a seedling culture medium 8a for cultivating seeds or seedlings S of plants, a planting work room 2 with a bacteria intrusion prevention structure 21a that can prevent bacteria from intruding inside of the planting work room from outside thereof, upon performing a planting work for planting the seeds or seedlings S of the plants in the seedling culture medium 8a of the culture medium holding units 3 within the planting work room and a plant cultivation room 6 for cultivating the plants Sa planted in the seedling culture medium 8a of the culture medium holding units 3 by transferring the plurality of culture medium holding units 3 in which the planting of the seeds or seedlings of plants is performed in the planting work room 2. The planting work room 2 includes a sterilization activity composition supplying device 23 which supplies the planting work room 2 with a predetermined amount of a sterilization activity composition which sterilizes a working space of the planting work room 2 under a state that the plurality of culture medium holding units 3 has been transferred into the planting work room 2, a sterilization activity composition concentration detecting device 24 provided in the planting work room 2 for detecting a concentration of the sterilization activity composition, an exhaust device 26 which discharge the sterilization activity composition from the planting work room 2 and an outside air supply device 25 which supplies the planting work room 2 with an outside air through a filter 25b which can catch the bacteria upon discharging the sterilization activity composition from the planting work room 2.

According to the structure of the embodiment, the culture medium holding units 3 transferred into the planting work room 2 and the working space of the planting work room 2 are sterilized by the sterilization activity composition supplied from the sterilization activity composition supplying device 23. The sterilization work can be surely executed by the sterilization activity composition detecting device 24 under the concentration of the sterilization activity composition being controlled to be the level necessary for sterilization. Then, the culture medium holding units 3 under the state that the seeds or seedlings S are planted on the seedling culture medium 8a thereof are transferred into the plant cultivation room 6, under the state the sterilization activity composition which may have a bad influence on the plants Sa has been completely removed by the exhaust device 26 and the outside air supply device 25. Thus, the sterilization state of the seeds or seedlings Sa before cultivation and the seedling culture medium 8a can be assured and the cultivation of plants Sa which have no diseases can be performed. Since the planting work is performed in the planting work room 2 with bacteria intrusion prevention structure, 21a, the workers do not need to wear cleaning room wears and accordingly, the planting work can be easily and promptly performed.

Further, the plant cultivation equipment 1 further includes a packing work room 7 with a sterilization intrusion prevention structure 71a which can prevent the bacteria from intruding inside from outside, when an indoor packing work for the plants Sb, which have been cultivated in the plant cultivation room 6, is performed. The packing work room 7 includes a sterilization activity composition supply device 23 which supplies the packing work room 7 with a predetermined amount of sterilization activity composition which sterilizes the packing work space into which the packing materials P are transferred, a sterilization activity composition detecting device 24 provided in the packing work room 7 and detecting the concentration of the sterilization activity composition, an exhaust device 26 which discharges the sterilization activity composition from the packing work room 7 and an outside air supply device 25 which supplies the packing work room 7 with the outside air through filter 25b which is capable of catching the sterilization activity composition, when the sterilization activity composition is discharged.

According to the structure above, the packing material P transferred into the packing work room 7 and the work space can be sterilized by the sterilization activity composition supplied by the sterilization activity composition supply device 23. The sterilization work can be surely executed by the sterilization activity composition detecting device 24 under the concentration of the sterilization activity composition being controlled to be the level necessary for sterilization. Then, the plants Sb, which have been cultivated in the plant cultivation room 6, are transferred into the packing work room under the state that the sterilization activity composition which may have a bad influence on the plants Sb has been completely removed from the packing work room 7 by the exhaust device 26 and the outside air supply device 25. Thus, the sterilization state of the cultivated plants Sb can be assured and bacteria-free plants Sb can be shipped. Since the packing work is performed in the packing work room 7 with the bacteria intrusion prevention structure, 21a, the workers do not need to wear cleaning room wears and accordingly, the packing work can be easily and promptly performed.

Further, the plant cultivation room 6 includes an atmospheric pressure raising device 63 which raises the atmospheric pressure level of the plant cultivation room 6 higher than the atmospheric pressure level of the planting work room 2 when supplying the planting work room 2 with the outside air for discharging the sterilization activity composition from the planting work room 2. Thus, the sterilization activity composition which may have a bad influence on the cultivated plants Sa can be prevented from leaking into the plant cultivation room 6 from the planting work room 2. Thus, bacteria-free state plants Sa can be cultivated.

It is noted that according to the embodiment, the plant cultivation equipment 1 is provided with the timer for measuring the lapsed time from the time when the sterilization activity composition with a predetermined concentration is supplied to the planting work room. However, it is not limited to this structure, but a watch owned by the worker can be used for measuring the time.

Further, the conveyor or the like is used as the transfer device for transferring the culture medium holding units 8 in the planting work room. However, it is not limited to this structure, but, for example, a container box which collects and accommodates the culture medium holding members on which the seeds or seedlings are cultivated in the media, may be prepared and the worker manually moves the container box.

Still further, an isolator is used as the bacteria intrusion prevention structure which can prevent the bacteria from intruding into the room from outside. However, it is not limited to this structure, but, for example, a clean bench may be used, instead. Further, both planting work room 2 and the packing work room 7 are structured as the bacteria intrusion prevention structure which can prevent the bacteria from intruding into the rooms 2 and 7. However, such bacteria intrusion prevention structure may be provided only for the planting work room which can prevent bacteria from intruding into the planting work room.

The culture medium holding unit 3 is provided with a plant holding portion having a plate shape portion. However, it is not limited to this structure, for example, a plant holding portion may be formed without plate portion.

Further, as the sterilization activity composition, ozone is used, however, it is not limited to ozone, but spray type sodium hypochlorite solution may be used instead. Still further, the atmospheric pressure raising device for raising the atmospheric pressure inside of the plant cultivation room 2 is used as the carbon dioxide supply device, however, it is not limited to the atmospheric pressure raising device and for example, an outside air supply device which can take-in the outside air may be used, instead. It is noted however, HEPA filter or the like which filters the intake air may be necessary.

As explained above, the concrete structure of the embodiment explained above indicates only an example of the implementation of the invention and the present invention is not limited to the concrete structure as explained above and various changes or modifications can be applicable as the invention so far as such changes or modifications are within the subject matter of the invention.

INDUSTRIAL APPLICABILITY

This invention is applicable when the plants for food are produced in a plant factory.

REFERENCE SIGNS LIST

1 . . . plant cultivation equipment, 2 . . . planting work room, 21*a* . . . housing (bacteria intrusion prevention structure), 23 . . . sterilization activity composition supply device, 24 . . . sterilization activity composition concentration detecting device, 25 . . . outside air supply device, 25*b* . . . HEPA filter (filter), 26 . . . exhaust device, 3 . . . culture medium holding unit, 6 . . . plant cultivation room, 63 . . . carbon dioxide supply device (atmospheric pressure raising device), 7 . . . packing work room, 71*a* . . . housing (bacteria intrusion prevention structure), 8*a* . . . seedling culture medium, P . . . packing material, S . . . seeds or seedlings, Sa . . . planted plants, Sb . . . cultivation finished plants.

The invention claimed is:

1. A plant cultivation equipment comprising:
a plurality of culture medium holding units equipped with a medium for cultivating seeds or seedlings of plants;
a planting work room, which is a highly secured airtightness housing, with a bacteria intrusion prevention structure that can prevent bacteria from intruding inside of the planting work room from outside thereof, upon performing a planting work for planting the seeds or seedlings of the plants in the medium of the culture medium holding units within the planting work room;
a plant cultivation room for cultivating the plants planted in the medium of the culture medium holding units after transferring the plurality of culture medium holding units in which the planting of the seeds or seedlings of plants is performed in the planting work room;
wherein the planting work room includes:
a work executing room in which a worker executes work for planting seeds or seedlings of plants in the seedling culture medium of the culture medium holding units, the work executing room includes a transparent panel made of a strengthened glass and a globe into which hands and arms of the worker are configured to be inserted; and
a worker room in which the worker works, the worker room is separated from the work executing room by the transparent panel and the globe,
wherein the work executing room includes:
a sterilization activity composition supplying device which supplies the planting work room with a predetermined amount of ozone which sterilizes a working space of the planting work room and the plurality of culture medium holding units equipped with the medium transferred into the planting work room;
a sterilization activity composition concentration detecting device provided in the planting work room for detecting a concentration of the ozone;
an exhaust device which discharges the ozone from the planting work room; and
an outside air supply device which supplies the planting work room with an outside air through a filter capable of catching the bacteria when the ozone is discharged,
wherein the planting work room and the plant cultivation room are partitioned by a sliding door configured to allow the culture medium holding units to pass there through,
wherein the plant cultivation room includes an atmospheric pressure raising device that raises an atmospheric pressure level inside the plant cultivation room higher than an atmospheric pressure level inside the planting work room when supplying the planting work room with the outside air for discharging the ozone from the planting work room,
wherein the atmospheric pressure raising device prevents the ozone in the planting work room from leaking into the plant cultivation room,
wherein the planting work room further includes:
a transfer inlet through which the seedlings and the culture medium holding units are moved in, a transfer outlet through which the culture medium holding units, under the state that the seedlings have been planted in the seedling culture medium of the culture medium holding units, are moved out, and a transfer device which transfers the culture medium holding units from the transfer outlet of the planting work room to a transfer mechanism of the plant cultivation room, wherein the transfer mechanism includes a plurality of transfer mechanisms provided in series in a transfer direction and each of the plurality of transfer mechanisms includes the culture medium holding unit to be transferred in the transfer direction, wherein the plurality of transfer mechanisms transfers the plurality of culture medium holding units such that one of the plurality of transfer mechanisms positioned at an upper stream side transfers the plurality of culture medium holding units to another one of the plurality of transfer mechanisms positioned at a downstream side neighboring to the one of the plurality of transfer mechanisms when the plurality of culture medium holding units is transferred in the transfer direction, and wherein a distance in the transfer direction between mutually neighboring culture medium holding units when the plurality of culture medium holding units is transferred in the transfer direction is set such that the distance between the culture medium holding units transferred by the another one of the plurality of transfer mechanisms positioned at the downstream side is set to be longer than the distance between the culture medium holding units transferred by the one of the plurality of transfer mechanisms positioned at the upper stream side.

2. The plant cultivation equipment according to claim 1, further comprising:

a packing work room with a bacteria intrusion prevention structure which can prevent bacteria from intruding inside from outside when an indoor packing work for the plants which have been cultivated in the plant cultivation room, is performed, wherein the packing work room includes:

a packing work executing room in which a worker executes work for packing the plants which have been cultured in the plant cultivation room; and a worker packing room in which the worker works, the worker packing room is separated from the packing work executing room, wherein the packing work executing room includes:

a sterilization activity composition supply device which supplies the packing work room with a predetermined amount of ozone which sterilizes a packing work space into which packing material is transferred;

a sterilization activity composition detecting device provided in the packing work room and detecting the concentration of the ozone;

an exhaust device which discharges the ozone from the packing work room; and an outside air supply device which supplies the packing work room with the outside air through the filter which is capable of catching the bacteria when the ozone is discharged, wherein the packing work room and the plant cultivation room are partitioned via a sliding door that allows the culture medium holding units to pass there through, wherein the atmospheric pressure raising device raises an atmospheric pressure level inside the plant cultivation room higher than an atmospheric pressure level inside the packing work room when supplying the packing work room with the outside air for discharging the ozone from the packing work room in a state in which the sliding door is closed, wherein the atmospheric pressure raising device prevents the ozone in the packing work room from leaking into the plant cultivation room, and wherein the plant cultivation equipment further includes a transfer device of the packing work room which transfers the culture medium holding units from the transfer mechanism of the plant cultivation room to the packing work room after a packing work space is sterilized in the packing work room and the ozone is discharged from the packing work room.

\* \* \* \* \*